United States Patent
Liu et al.

(10) Patent No.: US 12,505,001 B2
(45) Date of Patent: Dec. 23, 2025

(54) CONTROL METHOD FOR MULTI-CORE MCU TO ACCESS SHARED PERIPHERALS AND DEVICE THEREOF

(71) Applicant: SHENZHEN HANGSHUN CHIP TECHNOLOGY DEVELOPMENT CO., LTD, Shenzhen (CN)

(72) Inventors: Jiping Liu, Shenzhen (CN); Jie Pang, Shenzhen (CN); Huibing Xiong, Shenzhen (CN); Xiang Wang, Shenzhen (CN); Zengzhong Zheng, Shenzhen (CN)

(73) Assignee: SHENZHEN HANGSHUN CHIP TECHNOLOGY DEVELOPMENT CO., LTD, Shenzhen (CN)

( * ) Notice: Subject to any disclaimer, the term of this patent is extended or adjusted under 35 U.S.C. 154(b) by 0 days.

(21) Appl. No.: 18/291,828

(22) PCT Filed: Aug. 2, 2022

(86) PCT No.: PCT/CN2022/109602
§ 371 (c)(1),
(2) Date: Jan. 24, 2024

(87) PCT Pub. No.: WO2023/226189
PCT Pub. Date: Nov. 30, 2023

(65) Prior Publication Data
US 2025/0342070 A1    Nov. 6, 2025

(30) Foreign Application Priority Data

May 23, 2022 (CN) .......................... 202210562226.5

(51) Int. Cl.
*G06F 9/52* (2006.01)
*G06F 13/10* (2006.01)
*G06F 15/163* (2006.01)

(52) U.S. Cl.
CPC .............. *G06F 9/526* (2013.01); *G06F 13/10* (2013.01); *G06F 15/163* (2013.01)

(58) Field of Classification Search
CPC ......... G06F 9/526; G06F 13/10; G06F 15/163
See application file for complete search history.

(56) References Cited

U.S. PATENT DOCUMENTS 9,519,652 B2    12/2016    Su et al. ........... G06F 17/30171
2009/0157939 A1*  6/2009    Chu .................... G06F 13/42
                                                         710/313

(Continued)

FOREIGN PATENT DOCUMENTS

CN    101399695    4/2009 ............. H04L 12/24
CN    104063331    9/2014 ........... G06F 12/058

(Continued)

OTHER PUBLICATIONS

Translation of CN-110704198-A (Year: 2020).*

(Continued)

*Primary Examiner* — Henry Tsai
*Assistant Examiner* — John B Roche
(74) *Attorney, Agent, or Firm* — HAYES SOLOWAY P.C.

(57) ABSTRACT

The present disclosure discloses a control system and related devices for a multi-core MCU to access shared peripherals, the control system comprises: M storage modules, M processing modules, and N shared modules, for the storage module, the processing module, and the shared module connected successively in one line, the processing module is used for reading the first numerical value, and is used for transmitting data to the shared module when judging the first numerical value to be a target value, and is used for reading a second numerical value stored in the shared module after judging the first numerical value is the target value, and locking the corresponding shared module for data transmis- (Continued)

sion according to the second numerical value, the shared module is used to receive the data transmitted by the processing module when judging that the first numerical value is the target value.

12 Claims, 3 Drawing Sheets

(56) References Cited

U.S. PATENT DOCUMENTS

| | | | |
|---|---|---|---|
| 2019/0297084 A1 | 9/2019 | Li et al. | H04L 63/101 |
| 2021/0225416 A1 | 7/2021 | Mizrahi et al. | G11C 7/1012 |
| 2022/0156084 A1 | 5/2022 | Hui | G06F 9/3855 |

FOREIGN PATENT DOCUMENTS

| | | | | |
|---|---|---|---|---|
| CN | 104346317 | | 2/2015 | G06F 15/167 |
| CN | 110704198 A | * | 1/2020 | G06F 9/524 |
| CN | 111782669 A | * | 10/2020 | G06F 16/2343 |
| CN | 112631742 | | 4/2021 | G06F 9/46 |
| CN | 112905962 | | 6/2021 | G06F 21/12 |
| CN | 113039532 | | 6/2021 | G06F 13/16 |
| CN | 113486042 A | * | 10/2021 | G06F 16/2343 |
| CN | 114328322 | | 4/2022 | G06F 13/28 |
| CN | 114490127 | | 5/2022 | G06F 9/54 |
| CN | 114036091 | | 6/2023 | G06F 13/376 |

OTHER PUBLICATIONS

Translation of CN-111782669-A (Year: 2020).*
Translation of CN-113486042-A (Year: 2021).*
International Search Report (w/ English translation) and Written Opinion issued in PCT/CN2022/109602, dated Dec. 21, 2022, 8 pages.
First Examination Report issued in Chinese Patent Appln. Serial No. 202210562226.5, dated Feb, 6, 2023, with machine English translation, 12 pages.
Sundar Rajan et al., "Software-Based Approach for Sharing Real-Time Peripherals in a Virtual Automotive Microcontroller Platform" *SAE Int. J Cav* 4(2):205-220, 2021, abstract only, 2 pages.
"Mutli-core MCUs can be used to simplify embedded designs" www.elecfacs.com, English translation, Mar. 27, 2019, 17 pages.

* cited by examiner

| bit3 | bit2 | bit1 | bit0 |
|---|---|---|---|
| CPU4_LOCK | CPU3_LOCK | CPU2_LOCK | CPU1_LOCK |

CONTROL METHOD FOR MULTI-CORE MCU TO ACCESS SHARED PERIPHERALS AND DEVICE THEREOF

FIELD OF THE DISCLOSURE

The present disclosure relates to the technical field of integrated circuits, in particular relates to a control method for a multi-core MCU to access shared peripherals by and a device thereof.

BACKGROUND

With the rapid development of integrated circuits, MCU (Microcontroller Unit), is a chip-level computer formed by appropriately reducing the frequency and spec of Central Processing Unit (abbreviated as CPU, which is the operation and control core of the computer system and the final implementation unit of the information processing and program execution), and integrating memory, Timer, USB, A/D converter, UART, PLC, DMA and other peripheral interfaces, and even LCD drive circuit on a single chip. The MCU can be performed various control combinations for different application scenarios, and is also gradually developed in the direction of multi-core multi-hosts (multi-core MCU refers to an MCU with two or more CPU cores), for a peripheral in the shared space being accessed by a CPU, it may cause an error if another CPU also accesses this peripheral at the same time. In addition, some peripheral functions in the shared space are related to CPU cores, so these peripherals need to be restricted from being accessed by other CPUs. At the present stage, when multiple CPUs are accessing the same shared space at the same time, if a conflict arises at this time that causes CPU access failure, the peripheral cannot be used normally.

The present operation of multi-core MCU to access a shared peripheral is to read, write and operate a semaphore register by defining a software implemented on the register, which cannot avoid conflict effectively. On the other hand, if a CPU is configured to access a peripheral address through software, and another CPU does not read the semaphore register, but accesses it directly, then the same access conflict problem will occur. Neither of the two ways mentioned above can completely avoid conflicts.

As a result, there is room for improvement and enhancement of the prior art.

BRIEF SUMMARY OF THE DISCLOSURE

The main purpose of the present disclosure is to provide a control system and related devices for a multi-core MCU to access shared peripherals, aiming at solving the problem that multiple MCUs cannot access the same shared peripheral properly at the same time in the prior art.

In order to achieve the above purpose, the present disclosure adopts the following technical solutions:

A control system for a multi-core MCU to access shared peripherals, the control system for a multi-core MCU to access shared peripherals includes: M storage modules, M processing modules, and N shared modules, each of the processing modules is connected to one of the storage modules, and each of the processing modules is also connected to N shared modules, for the storage module, the processing module and the shared module successively connected in one line, the storage module is configured to generate and store a first numerical value after a power-on or reset operation on the storage module; the shared module is configured to read the first numerical value and transmit data to the shared module when judging that the first numerical value is a target value. shared modules, the storage module is configured to generate and store a first numerical value after a power-up or reset operation; the processing module is configured to read the first numerical value and transmit data to the shared module when judging that the first numerical value is a target value, read a second numerical value stored in the shared module after the first numerical value is a target value and lock a corresponding shared module for data transmission based on the second numerical value, and compare a third numerical value stored in the shared module with a predetermined value after reading the third numerical value, and unlock a locked state of the corresponding shared module if the values are equal, the shared module is configured to provide the second numerical value and the third numerical value, and receive the data transmitted by the processing module when judging the first numerical value is the target value.

In the control system for a multi-core MCU to access shared peripherals, the processing module comprises: a processor, the processor is connected to a corresponding one of the storage modules, and the processor is further connected to each of the shared modules.

In the control system for a multi-core MCU to access shared peripherals, the storage module comprises: a first register, the first register is connected to a corresponding one of the processing modules.

In the control system for a multi-core MCU to access shared peripherals, the shared module comprises: a second register and a third register, both the second register and the third register are connected to each of the processors.

In the control system for a multi-core MCU to access shared peripherals, the first register comprises an XX_ACCESSABLE register.

In the control system for a multi-core MCU to access shared peripherals, the second register comprises a LOCK register, and the third register comprises a KEY register.

A control method for a multi-core MCU to access shared peripherals based on the control system for a multi-core MCU to access shared peripherals described above, the control method for a multi-core MCU to access shared peripherals comprises steps:
  generating and storing, by the storage module, the first numerical value after the power-up or reset operation;
  reading, by the processing module, the first numerical value and judging whether the first numerical value is the target value, and if the first numerical value is the target value, transmitting the data to the shared module;
  reading, by the processing module, the second numerical value stored in the shared module after judging the first numerical value is the target value, and locking the corresponding shared module for data transmission based on the second numerical value.

In the control method for a multi-core MCU to access shared peripherals, the control method for a multi-core MCU to access shared peripherals comprises:
  generating, by the first register, the first numerical value and storing the first numerical value in the storage module after the power-up or reset operation;
  reading, by the processor, the first numerical value and judging whether the first numerical value is the target value, and if the first numerical value is the target value, transmitting the data to the shared module, otherwise prohibiting access to the shared module;
  reading, by the processor, the second numerical value pre-written in the second register after judging the first numerical value is the target value, and locking the corresponding shared module for data transmission based on the second numerical value.

In the control method for a multi-core MCU to access shared peripherals, the control method for a multi-core MCU to access shared peripherals further comprises:

reading, by the processor, the third numerical value pre-written in the third register when the shared module is in a locked access state, and if the third numerical value is equal to the predetermined value, then unlocking the corresponding shared module from the locked access state, otherwise, continuing to lock the corresponding shared module.

A computer-readable storage medium, a control program for a multi-core MCU to access shared peripherals is stored in the computer-readable storage medium, when the control program for a multi-core MCU to access shared peripherals is executed by a processor, the steps of the control method for a multi-core MCU to access shared peripherals described above are implemented.

Compared to the prior art, the present disclosure provides a control system for a multi-core MCU to access shared peripherals and device thereof. The control system includes: M storage modules, M processing modules and N shared modules; for the storage module, the processing module, and the shared module connected successively in one line, the storage module is configured to generate and store a first numerical value after a power-up or reset operation; the processing module is configured to read the first numerical value and transmit data to the shared modules when judging the first numerical value is a target value, and is configured to, after the first numerical value is judged as the target value, read a second numerical value stored in the shared module and lock the corresponding shared module for data transmission based on the second numerical value; the shared module is configured to provide the second numerical value, and receive the data transmitted by the processing module when judging the first numerical value is the target value. In the present disclosure, by judging whether the first numerical value is the target value, whether the data can be normally transmitted to the shared module is decided, and the present disclosure also could lock the corresponding shared module with the processing module for data transmission based on the second value, to enable multiple MCUs to normally access the same shared peripheral, thereby solving the conflict problem when multiple MCUs access a shared peripheral at the same time.

DRAWING LABELS

Figure 1:
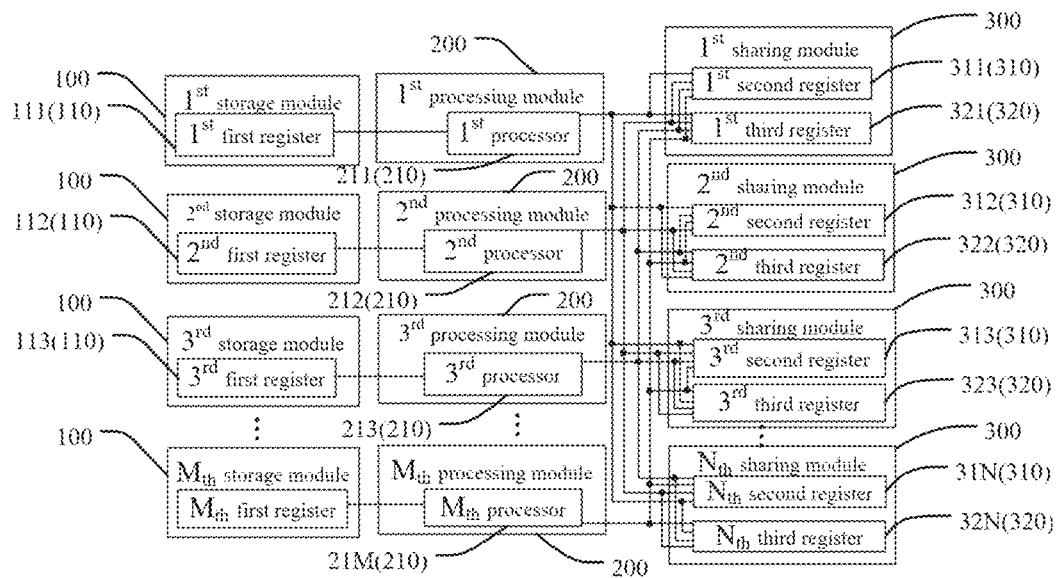
FIG. 1 shows a structural block diagram of an embodiment of a control system for a multi-core MCU to access shared peripherals provided by the present disclosure.

100: storage module, 110: first register, 200: processing module, 210: processor, 300: shared module, 310: second register, 320: third register.

DETAILED DESCRIPTION OF EMBODIMENTS

In order to make the objects, technical solutions and effects of the present disclosure clearer and more explicit, the present disclosure is described in further detail hereinafter with reference to the accompanying drawings and embodiments. It should be understood that the specific embodiments described herein are only for explaining the present disclosure and are not intended to limit the present disclosure.

It is understood by those skilled in the art that, unless otherwise stated, the singular forms "one", "a", "an", "the", and "said" used herein may also include the plural form. It should be further understood that the term "comprising" as used in the specification of the present disclosure refers to the presence of the described features, integers, steps, operations, elements and/or components, but does not exclude the presence or addition of one or more other features, integers, steps, operations, elements, components and/or groups thereof. It should be understood that when we say that a component is "connected" or "coupled" to another component, it may be directly connected or coupled to the other component, or there may be intermediate components. Furthermore, "connected" or "coupled" as used herein may include wirelessly connected or wirelessly coupled. The term "and/or" as used herein includes all or any one unit and all combinations of one or more associated listed items.

It should be understood by those skilled in the art that all terms used herein, including technical and scientific terms, have the same meaning as generally understood by those of ordinary skill in the art to which the present disclosure belongs, unless otherwise defined. It should also be understood that terms such as those defined in a general-purpose dictionary are to be understood as having a meaning consistent with that in the context of the prior art and are not to be construed in an idealized or overly formalized sense unless specifically defined as herein.

The present disclosure provides a control method for a multi-core MCU to access shared peripherals and related devices. In the present disclosure, first reading a first numerical value and judging whether the first numerical value is a target value, to decide whether data can be normally transmitted to a shared module, and reading a second numerical value and locking the corresponding shared module for data transmission based on the second numerical value when judging the first numerical value is the target value, and reading a third numerical value and comparing the third numerical value with a predetermined value when the shared module is in the locking state. If the third numerical value is equal to the predetermined value, unlock the locking state to realize normal access of multiple MCUs to the same shared peripheral, effectively improving the conflict problem when multiple MCUs access a shared peripheral at the same time.

The following is a description of the control system design scheme for multi-core MCUs to access shared peripherals through specific exemplary embodiments, and it should be noted that the following embodiments are only used to explain and illustrate the technical solutions of the disclosure, and are not specifically limitation:

Referring to FIG. 1, the present disclosure provides a control system for a multi-core MCU to access shared peripherals, the control system for a multi-core MCU to access shared peripherals comprises: M storage modules 100, M processing modules 200, and N shared modules 300, each processing module 200 is connected to one storage module 100, and each processing module 200 is also connected to N shared modules 300, for the storage module 100, the processing module 200 and the shared module 300 connected successively in one line, the storage module 100 is used for generating a first numerical value and storing the first numerical value after a power-on or reset operation, the processing module 200 is used for reading the first numerical value and transmitting data to the shared module 300 when judging that the first numerical value is a target value, for reading a second numerical value stored in the shared module 300 after the first numerical value is the target value and locking a corresponding shared module 300 for data transmission based on the second value, and for comparing a third numerical value with a predetermined value after reading the third numerical value stored in the shared module 300 and unlocking a locked state of the corresponding shared module 300 if the values are equal. The shared module 300 is used for providing the second numerical value and the third numerical value, and for receiving the data transmitted by the processing module 200 when judging that the first numerical value is the target value. The shared module 300 may be a shared peripheral, the storage module 100 is a flash option, the storage module 100 and the processing module 200 are both part of an MCU, and M MCUs may be constituted by M storage modules 100 and M processing modules 200, M may be equal to N. and are all positive integers greater than or equal to 1, the target value is "1".

Specifically, when a power-up or reset operation is performed on the control system for the multi-core MCU to access a shared peripheral, the storage module 100 generates the first numerical value and stores the first numerical value, and then the processing module 200 reads the first numerical value stored in the storage module 100 and judges whether the first numerical value is a target value ("1"), if the first numerical value is the target value, then the processing module 200 is able to access the corresponding shared module 300 normally and the processing module 200 transmits the data to the shared module 300, otherwise, for example, if the first numerical value is "O", then the processing module 200 is unable to access the shared module 300, which means it is unable to transmit the data to the shared module 300. Next, if the first numerical value is judged as the target value, the processing module 200 which has access locked can further read the second numerical value stored in the shared module 300 and lock the corresponding shared module 300 based on the second numerical value for data transmission. That is, based on the second numerical value, only specific processing module 200 can access the shared module 300. And when the locked state of the shared module 300 shall be unlocked, the processing module 200 is needed to read the third numerical value stored in the shared module 300 and compare the third numerical value with the predetermined value. If the values are equal, then the locked state of the shared module 300 is unlocked; otherwise, the locked state of the shared module 300 is maintained. It should be noted that unlocking the locked state of the corresponding shared module 300 can only be realized by the processing module 200 which has access locked with the locked shared module 300, i.e., the processing module 200 can only be locked or unlocked by itself.

In the present invention, whether the shared module 300 can be accessed normally, i.e., whether the data is transferred to the shared module 300, is determined by the processing module 200 judging whether the first numerical value is a target value, thereby realizing deciding whether to access the shared module 300 by judgment before accessing the shared module 300. Further, when the first numerical value is determined to be or not to be the target value, the present disclosure locks the corresponding shared module 300 with the processing module 200 for data transmission based on the second numerical value stored in the shared module 300, to realize exclusive access to the shared module 300 for specific processing module 200. In addition, the present disclosure realizes unlocking the locked state of the corresponding shared module 300 by comparing the third numerical value stored in the shared module 300 with the predetermined value and unlocking the locked state of the corresponding shared module 300 by the specific processing module 200 if the values are equal. Ultimately, the present disclosure effectively avoids the access conflict in address of the shared peripheral, and can avoid the occurrence of peripheral error operation.

It is to be noted that in the present disclosure it is also possible for the processing module 200 to transmit the data to the shared module 300 when judging that the first numerical value is "0", depending on how the conditions triggering normal access of the processing module 200 to the shared module 300 are designed.

Further, the storage module 100 comprises: a first register 110, the first register 110 is connected to a corresponding one of the processing modules 200, wherein each of the storage modules is labeled 100 in the embodiment of the present disclosure, but for the purpose of differentiation, the 1st first register is labeled 111, the 2nd first register is labeled 112, and the 3rd first register is labeled 113, the first register 110 comprises XX_ACCESSABLE register which belongs to part of the semaphore, and the XX_ACCESSABLE register is automatically loaded into the flash option when a power-up or reset is generated.

Specifically, when a power-up or reset operation is performed on the control system for the multicore MCU to access shared peripherals, the first numerical value within the XX_ACCESSABLE register is automatically loaded into the storage module 100 (flash option) so that the processor 210 can read the first numerical value stored in the storage module 100 and proceed the next step of the operation. In the present disclosure, after the power-up or reset operation, the first numerical value is automatically loaded into the storage module 100 through the XX_ACCESSABLE register so that the processor 210 can carry out determining whether it is possible to access the shared module 300 based on the first value after the reading operation.

Further, the processing module 200 comprises: a processor 210, the processor 210 is connected to a corresponding one of the storage modules 100, and the processors 210 are all also connected to each of the shared modules 300, wherein each of the processing modules is labeled 200 in embodiments of the present disclosure, but for the purpose of differentiation the 1st processor is labeled 211, the 2nd processor is labeled 212, and the 3rd processor is labeled 213, till the M-th processor is labeled 21M.

Specifically, when the power-up or reset operation is performed on the control system for the multi-core MCU to access shared peripherals, the storage module 100 generates the first numerical value and stores the first numerical value, and then the processor 210 reads the first numerical value stored in the storage module 100 and judges whether the first numerical value is a target value, if the first numerical value is the target value, then the processor 210 is able to access the corresponding shared module 300 normally, and the processor 210 transmits the data to the shared module 300, otherwise, the processor 210 is unable to access the shared module 300, i.e., it is unable to transmit the data to the shared module 300, and then, in that case, the processor 210 need not respond to an interrupt generated by the shared module 300, so that the overhead caused by unnecessary interrupt processing can be shielded.

Next, when judging that the first numerical value is the target value, the processor 210 which has been locked for access may also lock the shared module 300 for data transmission with the processor 210 based on a second numerical value by reading a second numerical value stored in the shared module 300, which means that according to the second numerical value, only a specific processor 210 is allowed to access the shared module 300. If there is a need to unlock the locked state of the shared module 300, it is necessary for the processor 210 to read the third numerical value stored in the shared module 300 and then compare it with the predetermined value: if they are equal, then unlock the locked state of the corresponding shared module 300, and if the values are unequal, then continue to maintain the locking state of the shared module 300. It should be noted that the same unlocking of the corresponding shared module 300 can only be done by the processor 210 which has locked access to the shared module 300, which means that the processor 210 can only lock and unlock by itself.

The processor 210 in the present disclosure realizes whether to have direct access to the shared module 300 by judging whether the first numerical value is a target value, realizes exclusive access to a particular shared module 300 by locking the corresponding shared module 300 for data transmission with the processor 210 based on the second numerical value, and realizes only the specific processor 210 can decide whether unlock the locked state of the corresponding shared module 300 by comparing the third numerical value with the predetermined numerical value and deciding whether to unlock the locked state of the corresponding shared module 300 based on the comparison result. Further, the shared module 300 comprises: a second register 310 and a third register 320, the second register 310 and the third register 320 are both connected to each of the processors 210, wherein each of the shared modules in embodiments of the present disclosure is labeled 300, but for differentiation purposes, the 1st second register is labeled 311, the 2nd second register is labeled 312, the 3rd second register is labeled 313, and so on till the N-th second register is labeled 31N, and similarly the 1st third register is labeled 321, the 2nd third register is labeled 322, and the 3rd third register is labeled 323, and so on till the N-th third register is labeled 32N, wherein the second register 310 comprises a LOCK register, the third register 320 comprises a KEY register, the LOCK register is a part of a semaphore register, and the LOCK register is readable and writable.

Figure 2:
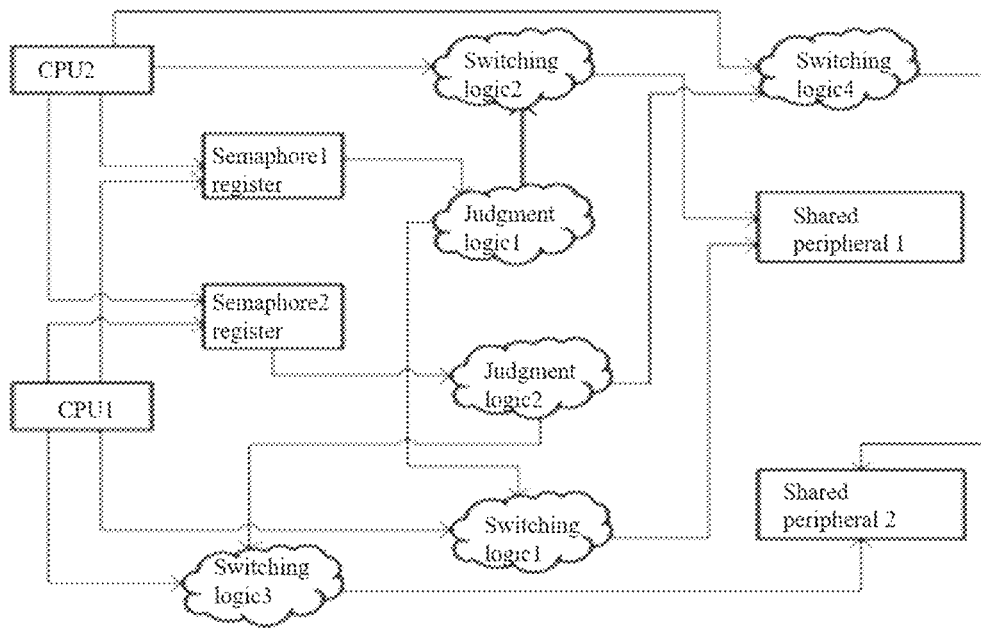
FIG. 2 shows a logical structure diagram of an embodiment of a control system for a multi-core MCU to access shared peripherals provided by the present disclosure.

Specifically, a logical structure diagram of the processor 210 and the shared module 300 is shown in FIG. 2, in which two processors 210 (CPU) and two shared peripheral addresses are taken as an example, wherein the semaphore1 register and the semaphore2 register are integrated with the XX_ACCESSABLE register and the LOCK register, the switching logic 1—switching logic 4 are opened by judgment logic, judgment logic 1 and judgment logic 2 are judgment conditions to determine whether the first numerical value is the target value, only when the first numerical value is the target value, the output result of the judgment logic is true, then control the switch logic to be on, which is a kind of hardware control. Each shared peripheral is connected to a set of semaphore registers (including XX_ACCESSABLE register and LOCK register). Two ways to access the shared peripheral are listed in FIG. 2, and CPU2 is taken as an example to illustrate: CPU2 can directly access the shared peripheral 1 and shared peripheral 2 through switching logic 2 and switching logic 4, but the switching logic is turned on by judgment logic, so without the judgment condition of the switching logic, the switching logic 2 and switching logic 4 can't be directly turned on, but the first numerical value stored in the XX_ACCESSABLE register in CPU1 and in CPU2 can be uploaded to the storage module 100 (flash option) when being powered on or reset, and then, whether the shared peripheral can be accessed or not can be determined by the judgment logic, i.e., by judging whether the first numerical value is the target value to see whether turning on the switching logic.

Figures 3, 4:
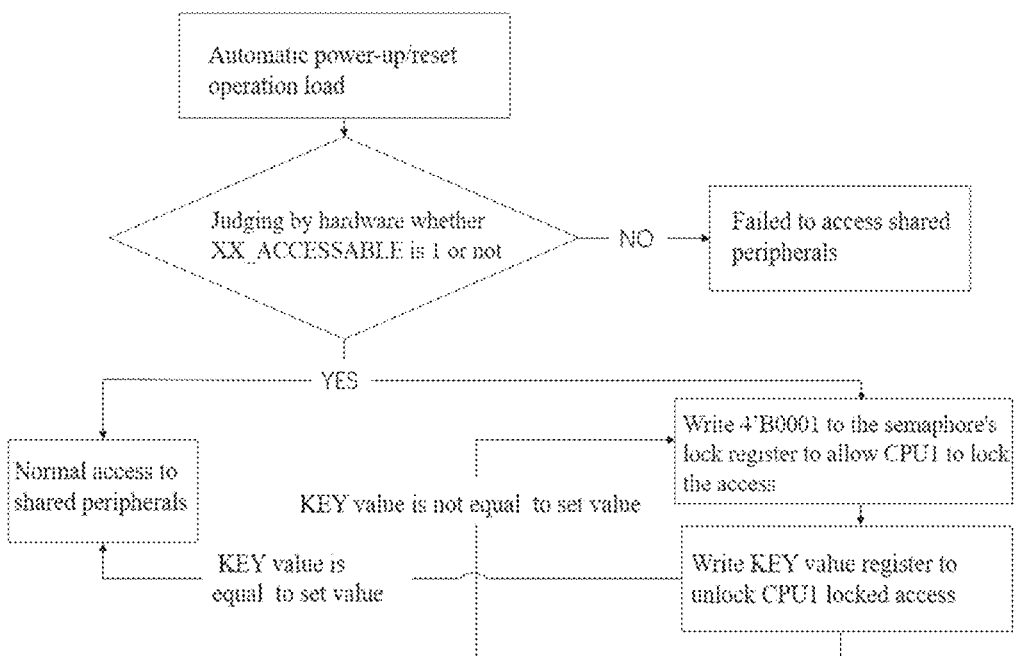
FIG. 3 shows a diagram of locking process of a processor in an embodiment of a control system for a multi-core MCU to access shared peripherals provided by the present disclosure.
FIG. 4 shows a general flowchart of an embodiment of a control system for a multi-core MCU to access shared peripherals provided by the present disclosure.

And after judging that the first numerical value is the target value, the processor 210 may also read the pre-written second numerical value stored in the second register 310 (LOCK register) in the shared module 300 and lock the corresponding shared module 300 with the processor 210 for data transmission based on the second value, i.e., for one of the shared peripherals n, there may be Q processors 210 are connected to the LOCK register in the shared peripheral, then by the second numerical value read by each of the Q processors 210, one processor 210 of the Q CPUs is locked with the shared peripheral n for data transmission, the specific locking process is shown in FIG. 3. As shown in FIG. 3, 4 processors 210 (CPUs) connected to a shared peripheral are taken as an example, the 4-bit binary number composed of 4 CPUs is determined, that is, to determine whether the 4-bit binary number composed of the second numerical value stored in each of the 4 LOCK registers is the target value. If the 4 second numerical values are "0", no access is locked, then a different value can be written to the LOCK registers to lock the access, i.e., the corresponding CPU can be locked by changing the second numerical value as shown below:

4'b0001 means that only CPU1 is allowed to access the shared peripheral 1, 4'b0010 means that only CPU2 is allowed to access the shared peripheral 1, 4'b0100 means that only CPU3 is allowed to access the shared peripheral 1, 4'b1000 means that only CPU4 is allowed to access the shared peripheral 1. And similarly, in case of a connection to the shared peripheral 2, the access is locked in the same way. And for one shared peripheral, only one processor 210 can be locked, which means that in case the one shared peripheral is connected to more than one processors 210, only one of the second numerical values corresponding to the LOCK registers can be valid at the same time (at the same time, only one bit is the target value).

If the locked state of the shared module 300 is to be unlocked, it is necessary for the processor 210, which has been locked, to read the pre-written third numerical value stored in the third register 320 (KEY register) in the shared module 300 and compare the third numerical value with the predetermined value: if the values are equal, then the locked state of the shared module 300 is unlocked, and if the values are not equal, then the locked state of the shared module 300 continues to be maintained, thus realizing that the shared module 300 can only be unlocked by itself. The general flow chart of the control system for the multi-core MCU to access shared peripherals provided by the present disclosure is shown in FIG. 4, wherein the "hardware judgment" is a process in which the processor 210 directly reads the first numerical value and judges whether it is a target value or not, the KEY value is the third numerical value, and the set value is the predetermined value, and when the KEY value is equal to the set value, the shared peripheral can accept normal access from all CPUs.

In the present disclosure, by dividing the semaphore registers into two parts: the XX_ACCESSABLE register and the LOCK register, and configuring the XX_ACCESSABLE register in the storage module 100 (flash option) and the LOCK register in the shared module 300 (external device), by locking the corresponding shared module 300 for data transmission with the processor 210 based on the pre-written second numerical value stored in the second register 310 (LOCK register) in the shared module 300, and by realizing, based on the pre-written third numerical value stored in the third register 320 (KEY register), that only one processor 210 can be adopted to lock or self-unlock at one time, conflicts caused by multi-core MCUs accessing shared peripherals at the same time are effectively avoided.

Figure 5:
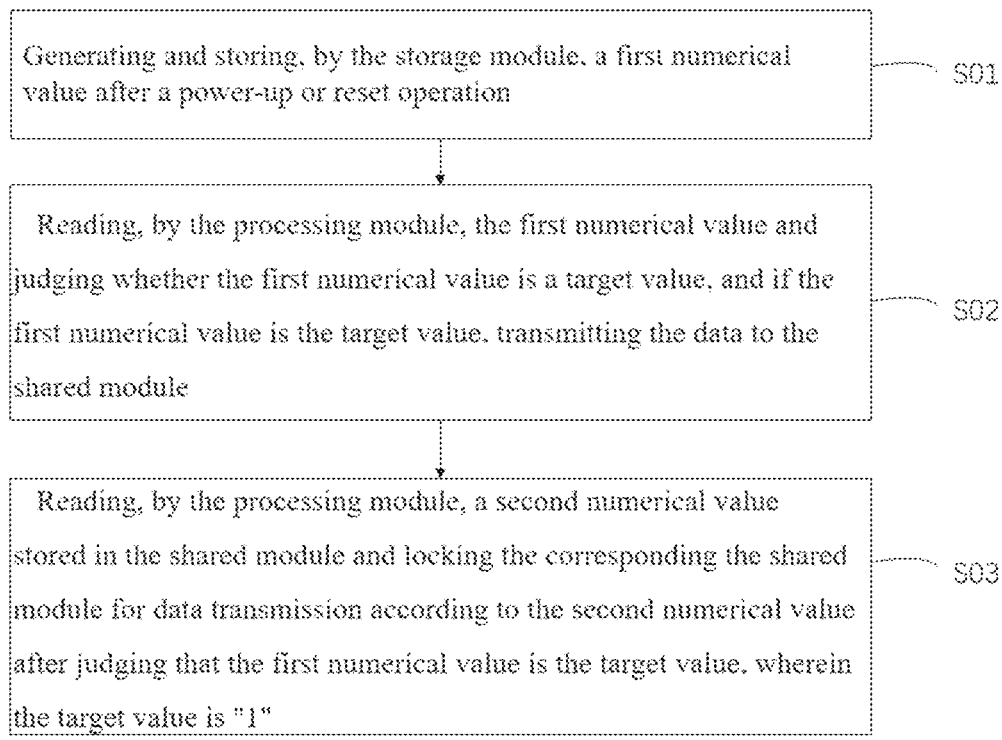
FIG. 5 shows a flowchart of an embodiment of a control method for a multi-core MCU to access shared peripherals provided by the present disclosure.

Further, referring to FIG. 5, the present disclosure provides a control method for a multi-core MCU to access shared peripherals based on the control system for a multi-core MCU to access shared peripherals described above, the method comprises the following steps:

S01, generating and storing, by the storage module 100, a first numerical value after a power-up or reset operation, S02, reading, by the processing module 200, the first numerical value and judging whether the first numerical value is a target value, and if the first numerical value is the target value, transmitting the data to the shared module 300, S03, reading, by the processing module 200, a second numerical value stored in the shared module 300 and locking the corresponding the shared module 300 for data transmission according to the second numerical value after judging that the first numerical value is the target value, wherein the target value is "1".

Specifically, after the power-up or reset operation, the storage module 100 generates the first numerical value and stores the first numerical value, and then the processing module 200 reads the first numerical value stored in the storage module 100 and judges whether or not the first numerical value is a target value ("1"), and if the first numerical value is the target value, then the processing module 200 is able to access a corresponding shared module 300 normally, and the processing module 200 transmits the data to the shared module 300. Otherwise, the processing module 200 is unable to access the shared module 300, thereby making the decision of whether or not to access the shared module 300 by judging whether or not the first numerical value is the target value. Next, when it is determined that the first numerical value is the target value, the processing module 200 may also read the second numerical value stored in the shared module 300 and lock the corresponding the shared module 300 for data transmission according to the second numerical value, thereby realizing exclusive access to the shared module 300 for the specific processing module 200, which in turn can effectively avoid access conflicts in address of the shared peripheral, and can avoid the occurrence of peripheral error operation.

Figure 6:
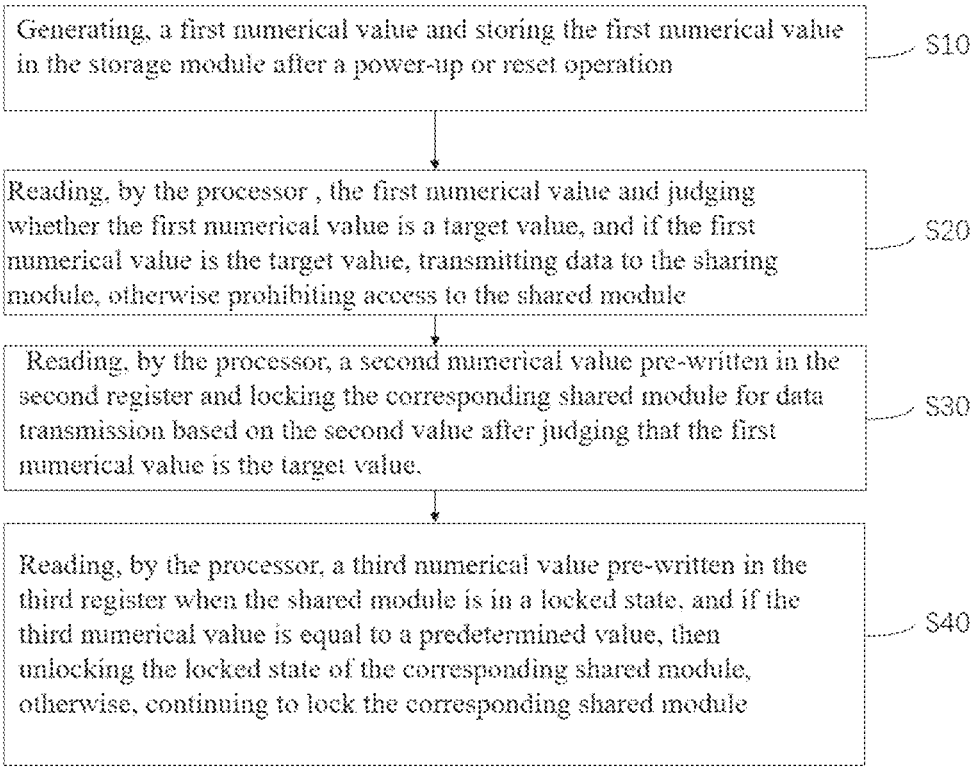
FIG. 6 shows a specific flowchart of an embodiment of a control method for a multi-core MCU accessing a shared peripheral provided by the present disclosure.

Further, referring to FIG. 6, the control method for a multi-core MCU to access shared peripherals comprises:

S10, generating, by a first register 110, a first numerical value and storing the first numerical value in the storage module 100 after a power-up or reset operation, S20, reading, by the processor 210, the first numerical value and judging whether the first numerical value is a target value, and if the first numerical value is the target value, transmitting data to the shared module 300, otherwise prohibiting access to the shared module 300, S30, reading, by the processor 210, a second numerical value pre-written in the second register 310 and locking the corresponding shared module 300 for data transmission based on the second value after judging that the first numerical value is the target value.

Further, please continue to refer to FIG. 6, the control method for a multi-core MCU to access shared peripherals further comprises:

S40, reading, by the processor 210, a third numerical value pre-written in the third register 320 when the shared module 300 is in a locked state, and if the third numerical value is equal to a predetermined value, then unlocking the locked state of the corresponding shared module 300, otherwise, continuing to lock the corresponding shared module 300.

Specifically, after the power-on or reset operation, the first numerical value in the first register 110 is automatically loaded into the storage module 100 (flash option), the processor 210 then reads the first numerical value in the storage module 100 and makes a judgment: if the first numerical value is the target value, then the processor 210 is able to normally access the corresponding shared module 300, otherwise, for example, if the first numerical value is "0", the processor 210 is unable to access the shared module 300, which means that it is unable to transfer the data to the shared module 300. Next, when judging that the first numerical value is the target value, the processor 210 may also lock the corresponding shared module 300 with the processor 210 for data transmission based on the second numerical value by reading the pre-written second numerical value stored in the second register 310 (LOCK register), thereby realizing that by pre-setting the second numerical value to a high level, other processors 210 are not allowed to access this shared peripheral. Finally, if there a need to unlock the locked state of the shared module 300, then the processor 210, which has been locked access, is required to read the pre-written third numerical value stored in the third register 320 (KEY register) in the shared module 300, and to compare the third numerical value with the predetermined value: if the values are equal, then unlocking of the shared module 300 is done accordingly, and if the values are unequal, then continuing to maintain the locked state of the shared module 300.

In the present disclosure, after judging that the first numerical value in the first register 110 is a target value, the processor 210 locks the corresponding processor 210 with the shared module 300 (shared peripheral) for access according to the second numerical value in the second register 310 (LOCK register), thereby effectively avoiding access conflicts and incorrect operation of shared peripheral when a plurality of processors 210 are connected to the shared peripheral. Further, the processor 210 that has been locked for access compares the third numerical value in the third register 320 (KEY register) with the predetermined value, and if third numerical value is equal to the predetermined value, unlocks the corresponding shared module 300 from the locked state, thereby enabling the processor 210 to realize self-lock and self-unlock.

Further, the present disclosure also provides a computer-readable storage medium, the computer-readable storage medium stores a control program for a multi-core MCU to access shared peripherals, when the control program for a multi-core MCU to access shared peripherals is executed by a processor 210, the steps of the control method for a multi-core MCU to access shared peripherals are implemented as described above, as the steps of the control method for the multi-core MCU to access shared peripherals are described in detail, they will not be repeated herein.

Further, the present disclosure also provides a computer-readable storage medium, the computer-readable storage medium stores an automatic parallel policy search program 40, when the automatic parallel policy search program 40 is executed by a processor 210, the steps of the control method for a multi-core MCU to access shared peripherals are implemented as described above, as the steps of the control method for the multi-core MCU to access shared peripherals are described in detail, they will not be repeated herein.

In summary, the present disclosure provides a control system and related devices for a multi-core MCU to access shared peripherals, the control system comprises: M storage modules, M processing modules and N shared modules. The storage module is used for generating a first numerical value and storing the first numerical value after a power-on or reset operation. And for the storage module, the processing module, and the shared module connected successively in one line, the processing module is used for reading the first numerical value, and is used for transmitting data to the shared module when judging the first numerical value to be a target value, and is used for reading a second numerical value stored in the shared module after judging the first numerical value is the target value, and locking the corresponding shared module for data transmission according to the second numerical value. The shared module is used for providing the second numerical value, and for receiving the data transmitted by the processing module when judging the first numerical value to be the target value. In the present disclosure, by judging whether the first numerical value is the target value, whether the data can be normally transmitted to the shared module is decided, and the corresponding shared module is also locked with the processing module for data transmission based on the second value, then realizing multiple MCUs to normally access the same shared peripheral, thereby solving the conflict problem when multiple MCUs access a shared peripheral at the same time.

It should be understood that to those skilled in the art, equivalent substitutions or changes may be made in accordance with the technical solution of the present disclosure and its inventive conception, and all such changes or substitutions shall fall within the scope of protection of the claims appended to the present disclosure.

What is claimed is:

1. A control system for a multi-core MCU to access shared peripherals comprising:
   an M number of storage modules, an M number of processing modules and an N number of shared modules, wherein each of the processing modules is connected to one of the storage modules, and each of the processing modules is also connected to the N number of shared modules;
   wherein for the storage module, the processing module, and the shared module connected successively in one line, the storage module is configured to generate and store a first numerical value after a power-up or reset operation;
   wherein the processing module is configured to read the first numerical value and transmit data to the shared modules when judging the first numerical value is a target value, read a second numerical value stored in the shared module and lock a corresponding shared module for data transmission based on the second numerical value, and read a third numerical value stored in the shared module to compare the third numerical value with a predetermined value, and unlock a locked state of the corresponding shared module when the third numerical value is equal to the predetermined value; and
   wherein the shared module is configured to provide the second numerical value and the third numerical value, and receive the data transmitted by the processing module when judging the first numerical value is the target value.

2. The control system for a multi-core MCU to access shared peripherals according to claim 1, wherein the processing module comprises:
   a processor connected to a corresponding one of the storage modules, and wherein the processor is further connected to each of the shared modules.

3. The control system for a multi-core MCU to access shared peripherals according to claim 1, wherein the storage module comprises: a first register connected to a corresponding one of the processing modules.

4. The control system for a multi-core MCU to access shared peripherals according to claim 2, wherein the shared module comprises: a second register and a third register, wherein both the second register and the third register are connected to the processor.

5. The control system for a multi-core MCU to access shared peripherals according to claim 3, wherein the first register comprises an XX_ACCESSABLE register.

6. The control system for a multi-core MCU to access shared peripherals according to claim 4, wherein the second register comprises a LOCK register, and the third register comprises a KEY register.

7. A control method for a multi-core MCU to access shared peripherals based on the control system for a multi-core MCU to access shared peripherals according to claim 1, wherein the control method for a multi-core MCU to access shared peripherals comprises steps of:
   generating and storing, by the storage module, the first numerical value after the power-up or reset operation;
   reading, by the processing module, the first numerical value and judging whether the first numerical value is the target value, and when the first numerical value is the target value, transmitting the data to the shared module; and
   reading, by the processing module, the second numerical value stored in the shared module after judging the first numerical value is the target value, and locking the corresponding shared module for data transmission based on the second numerical value.

8. The control method for a multi-core MCU to access shared peripherals according to claim 7, further comprising:
   generating, by a first register, the first numerical value and storing the first numerical value in the storage module after the power-up or reset operation;
   reading, by the processor, the first numerical value and judging whether the first numerical value is the target value, and when the first numerical value is the target value, transmitting the data to the shared module, otherwise prohibiting access to the shared module; and reading, by the processor, the second numerical value pre-written in a second register after judging the first numerical value is the target value, and locking the corresponding shared module for data transmission based on the second numerical value.

9. The control method for a multi-core MCU to access shared peripherals according to claim 8, further comprising:

reading, by the processor, the third numerical value pre-written in a third register when the shared module is in a locked access state, and when the third numerical value is equal to the predetermined value, unlocking the corresponding shared module from the locked access state, otherwise, continuing to lock the corresponding shared module.

10. A non-transitory computer-readable storage medium, wherein a control program for a multi-core MCU to access shared peripherals is stored in the computer-readable storage medium, when the control program for a multi-core MCU to access shared peripherals is executed by a processor, a control method for a multi-core MCU to access shared peripherals is implemented, the control method comprising:

generating and storing, by a storage module, a first numerical value after a power-up or reset operation;

reading, by a processing module, the first numerical value and judging whether the first numerical value is a target value, and when the first numerical value is the target value, transmitting data to the shared module; and reading, by the processing module, a second numerical value stored in the shared module after judging the first numerical value is the target value, and locking a corresponding shared module for data transmission based on the second numerical value.

11. The non-transitory computer-readable storage medium according to claim 10, wherein the control method for a multi-core MCU to access shared peripherals comprises:

generating, by a first register, the first numerical value and storing the first numerical value in the storage module after the power-up or reset operation;

reading, by the processor, the first numerical value and judging whether the first numerical value is the target value, and when the first numerical value is the target value, transmitting the data to the shared module, otherwise prohibiting access to the shared module; and reading, by the processor, the second numerical value pre-written in a second register after judging the first numerical value is the target value, and locking the corresponding shared module for data transmission based on the second numerical value.

12. The non-transitory computer-readable storage medium according to claim 11, wherein the control method for a multi-core MCU to access shared peripherals further comprises:

reading, by the processor, a third numerical value pre-written in a third register when the shared module is in a locked access state, and when the third numerical value is equal to the predetermined value, unlocking the corresponding shared module from the locked access state, otherwise, continuing to lock the corresponding shared module.

* * * * *